April 4, 1967 B. BARBER ETAL 3,312,932
ELECTRICAL CONVERSION OF TRANSIENT VECTOR
SIGNALS FOR RECORDER APPLICATION
Filed Oct. 28, 1963 4 Sheets-Sheet 2
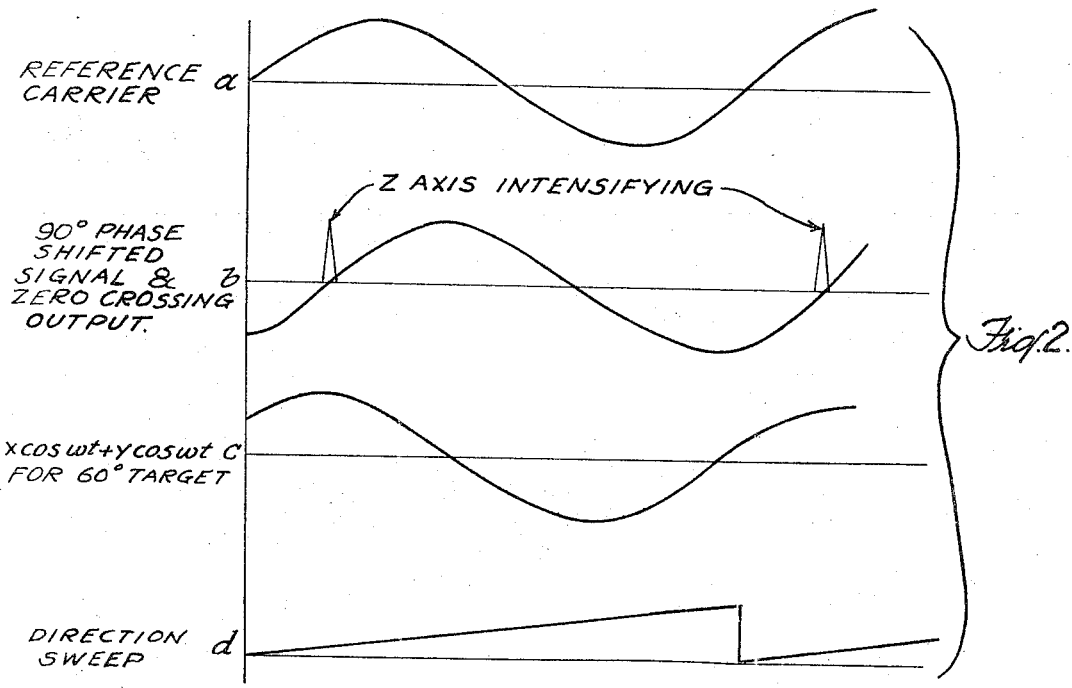
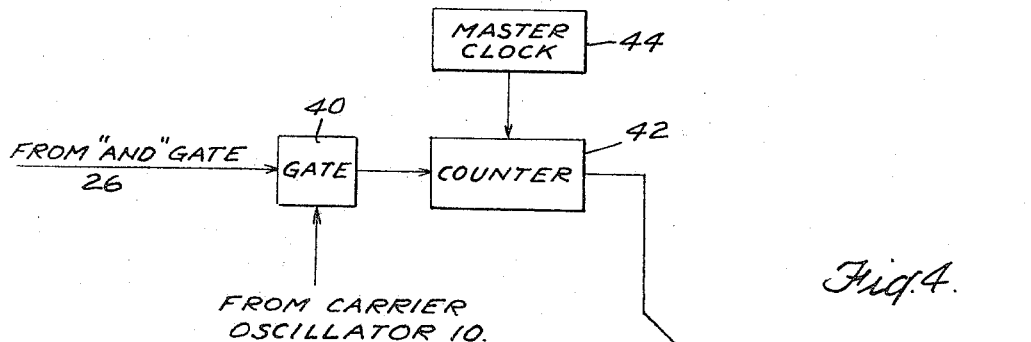
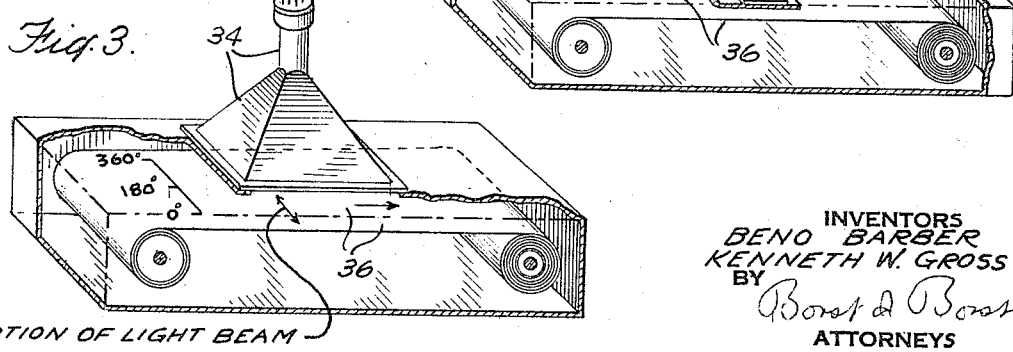
INVENTORS
BENO BARBER
KENNETH W. GROSS
BY
Borst & Borst
ATTORNEYS

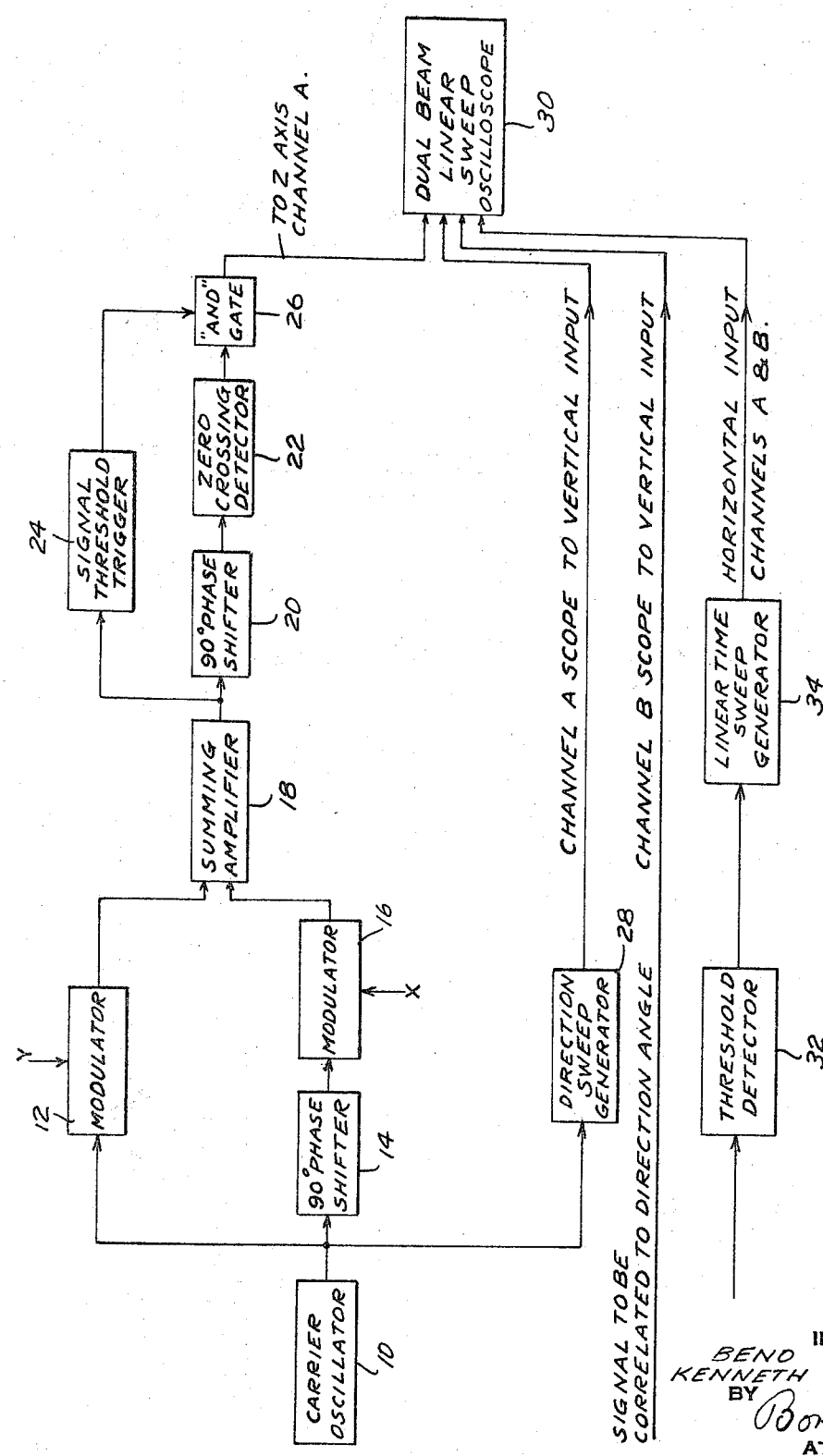

GEOGRAPHICAL PLOT

United States Patent Office 3,312,932
Patented Apr. 4, 1967

3,312,932
ELECTRICAL CONVERSION OF TRANSIENT VECTOR SIGNALS FOR RECORDER APPLICATION
Beno Barber, Brooklyn, and Kenneth W. Gross, Forest Hills, N.Y., assignors to Sperry Rand Corporation, Ford Instrument Company Division, a corporation of Delaware
Filed Oct. 28, 1963, Ser. No. 319,598
2 Claims. (Cl. 340—6)

This invention relates to a system for displaying or recording electrical signals and in particular the instantaneous direction angle of an electrical vector having momentary characteristics.

There are presently known processing circuits designed to provide X and Y voltages which are components determined by the magnitude and direction of a signal vector. The present invention provides a method for displaying or recording in some form this electrical signal vector. The vector may be shown as by an oscilloscope or as a printed record.

In addition to displaying a single electrical signal, the oscilloscope or recorder, according to the invention, is enabled to correlate two or more signals by determining their time difference and their angle difference even though the signals do not occur simultaneously; also, the recording system can correlate direction angles of electrical signals with other phenomena occuring at the same time in the system. The system is operative whether or not the direction angle of the displayed signal varies during observation and is not limited by the time duration of the vector signal which describes the direction angle.

One object of the invention is to provide a system for recording the direction angle of a signal which exists only momentarily.

Another object of the invention is to provide a signal recorder which is enabled to correlate two or more electrical signals both in terms of time and their direction angle.

Other objects and advantages of the invention may be appreciated on reading the following description which is taken in conjunction with the accompanying drawings, in which:

FIG. 1 is a block diagram of the recording apparatus arranged according to the invention;

FIG. 2 illustrates the signals produced in the recording system;

FIG. 3 is an illustration of a photoelectric printer for recording direction angle signals;

FIG. 4 illustrates a count and print out system for recording direction angle signals;

Figure 5:
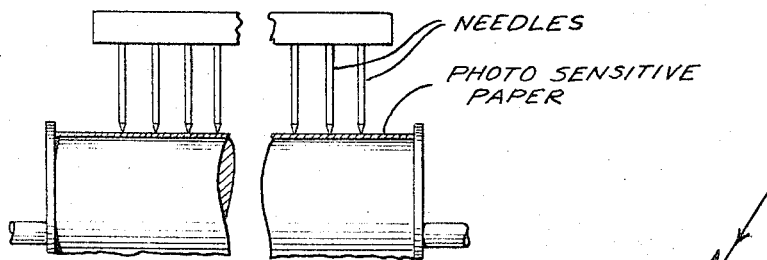
FIG. 5 illustrates an electric needle type print out for a direction angle recording system.

This invention is designed to operate with a signal data processing circuit that provides an X and Y voltage proportional to the direction of a signal vector. The characteristic of the signal is that it may be momentary and fleeting. In a general sense, the direction angle of the electrical signal, whose X and Y component voltages are placed in the present system, is derived according to the following function:

(1) $\quad X \cos(\omega t) + Y \sin(\omega t)$

The value of the function reaches a maximum at its angular position $\omega t$ corresponding to the direction angle $$\tan^{-1}\left(\frac{Y}{X}\right)$$

of the signal vector. This may be demonstrated by taking the derivative of the function and equating the derivative to zero to find the relation between the variables $\omega t$, X and Y of the function at its maximum value.

Thus $$\frac{d}{dt}[X \cos(\omega t) + Y \sin(\omega t)] = (-X \sin \omega t_0 + Y \cos \omega t_0) = 0$$

and, therefore, $$\frac{Y}{X} = \tan \omega t_0$$

where $t_0$ is taken relative to the carrier oscillator and $\omega$ is the radian frequency of the carrier oscillator. The input mechanism in control of the display determines when such maximum occurs and actuates the display accordingly.

Referring to FIG. 1, the signal $Y \sin(\omega t)$ is generated by applying a carrier signal $\sin(\omega t)$ from oscillator 10 to modulator 12 whose input is the Y component. The signal $X \cos(\omega t)$ is generated by applying a 90° phase shifted carrier through phase shifter 14 to modulator 16 whose input is the X component.

The sum $$Y \sin(\omega t) + X \cos(\omega t)$$

computed by summing amplifier 18 is fed to a 90° phase shifter 20 and is then fed to a zero crossing detector 22 which produces a pulse whenever the signal goes through a zero point. The detector is used because the zero point is defined more sharply than a maximum point. See FIG. 2b.

To prevent the system noise from generating erroneous zero crossing pulses during the time when no vector signal is present, the sum $$X \cos(\omega t) + Y \sin(\omega t)$$

is also fed to a signal threshold trigger 24 which gives no output for system noise but will give a pulse output when $$X \cos(\omega t) + Y \sin(\omega t)$$

is present and positive. Both the zero crossing circuit and threshold circuit are fed to an "AND" gate 26 which gives an output only when both signals are present at the same time.

A linear sweep generator 28 which is synchronized to the carrier oscillator 10 is applied by channel A to the vertical input plates of a dual beam oscilloscope tube 30. The linear sweep will be defined as the direction sweep and the width corresponds to one cycle of carrier signal. See FIG. 2a and FIG. 2d. The slope of the sweep signal is chosen such that a complete sweep moves the electron beam across 360° markings on the face of the tube. The beam intensity is turned down so that only the signal coming from the "AND" gate 26 applied to Z axis of scope will illuminate a point on the scope. Thus, the pulse which is generated at the time when $$X \cos(\omega t) + Y \sin(\omega t)$$

is maximum illuminates a point on the scope corresponding to the direction angle determined by the X and Y components.

It may be desired to measure the difference in time between two or more direction angles. To that end, there is provided threshold detector 32 which detects pulses passed by the "AND" gate 26 representing the first direction angle. Linear time sweep generator 34 is actuated by the detector 32 to apply a "time" sweep on channel A to the horizontal input plates of the oscilloscope tube 30. To measure the time between the existence of two or more direction angles, the "time" sweep is initiated by the first direction angle signal and the sweep is used to measure the time of appearance for the next succeeding signal. This is achieved due to the fact that the first signal is employed to initiate movement of the horizontal deflection plates by means of the sweep generator 34. A sweep cycle is therefore completed regardless of the presence of other signals. Once the first signal has disappeared there will be no illumination until the second signal appears on the Z axis at which point the displacement of the horizontal beam can be perceived and this displacement will therefore be a measure of the time difference between the two signals.

The "time" sweep generated by unit 34 is also placed on channel B and applied to the horizontal input plates in control of the second beam of the sweep oscillator 30. A signal representing some event in the system may then be placed on channel B to be applied to the vertical input plates for the second beam. Such an event may be the instant of time when a torpedo is fired to destroy a target the time indicating signal being placed on channel B as by radio relay signal. The time of the event with reference to the time of the direction angle signal which initiated the "time" sweep in channel B can then be measured by the "time" sweep developed in the scope by the horizontal plates.

For recording purposes the pulse from the "AND" gate 26 may be used to command a print out onto light sensitive paper. As shown in FIG. 3, a photoelectric scanning head 34 is disposed over photosensitive paper 36 which is shielded from other light sources not shown. A "direction" sweep from generator 28 moves the light source across the width of the paper. The light source in the scanning head is normally off but on gate pulse command will produce a beam for print out onto the light sensitive paper. The position of the read out on reference to 0°–360° scale will yield the desired direction angle information. The paper 36 is moved as on rolls by the operator at a selected speed.

There is shown in FIG. 4 a count and print out system for recording direction angles. As shown, the direction angle timing pulse from "AND" gate 26 is used to open gate 40 which is closed by a reference pulse from the carrier oscillator 10. Counter 42 driven by clock 44 is controlled by gate 40 and counts during the period the gate is open. The count during this period is used to activate a corresponding number of light cells in light box 46 disposed over photosensitive paper 48, the number of activated light cells illuminating the photosensitive paper being proportional to the direction angle. The reference pulse may be used as shown to reset the counter or the activated lights may be reset at the end of each period of carrier oscillation.

The rate of the master clock may be determined by the following consideration:

Let Δ stand for the smallest incremental direction angle to be displayed on the paper. Then $$\frac{360}{\Delta} \times f_o = f_m$$

where $f_c$=frequency of carrier oscillator.
$f_m$=frequency of master clock.

The series of lights in box 46 may be replaced by a series of needles, one of which would be energized by the counter according to direction angle. Special paper, which is shown, would then replace the photosensitive paper. See FIG. 5.

Referring again to FIG. 4, it is possible in operation to preset the counter according to a particular direction angle and then feed a second direction angle, which may not occur simultaneously, to the recording system and the resulting display would be the difference between the two direction angles rather than an absolute direction angle. Time between two successive direction angles may be determined by measuring the distance between them on paper and dividing that distance by the rate of paper travel.

Figure 6:
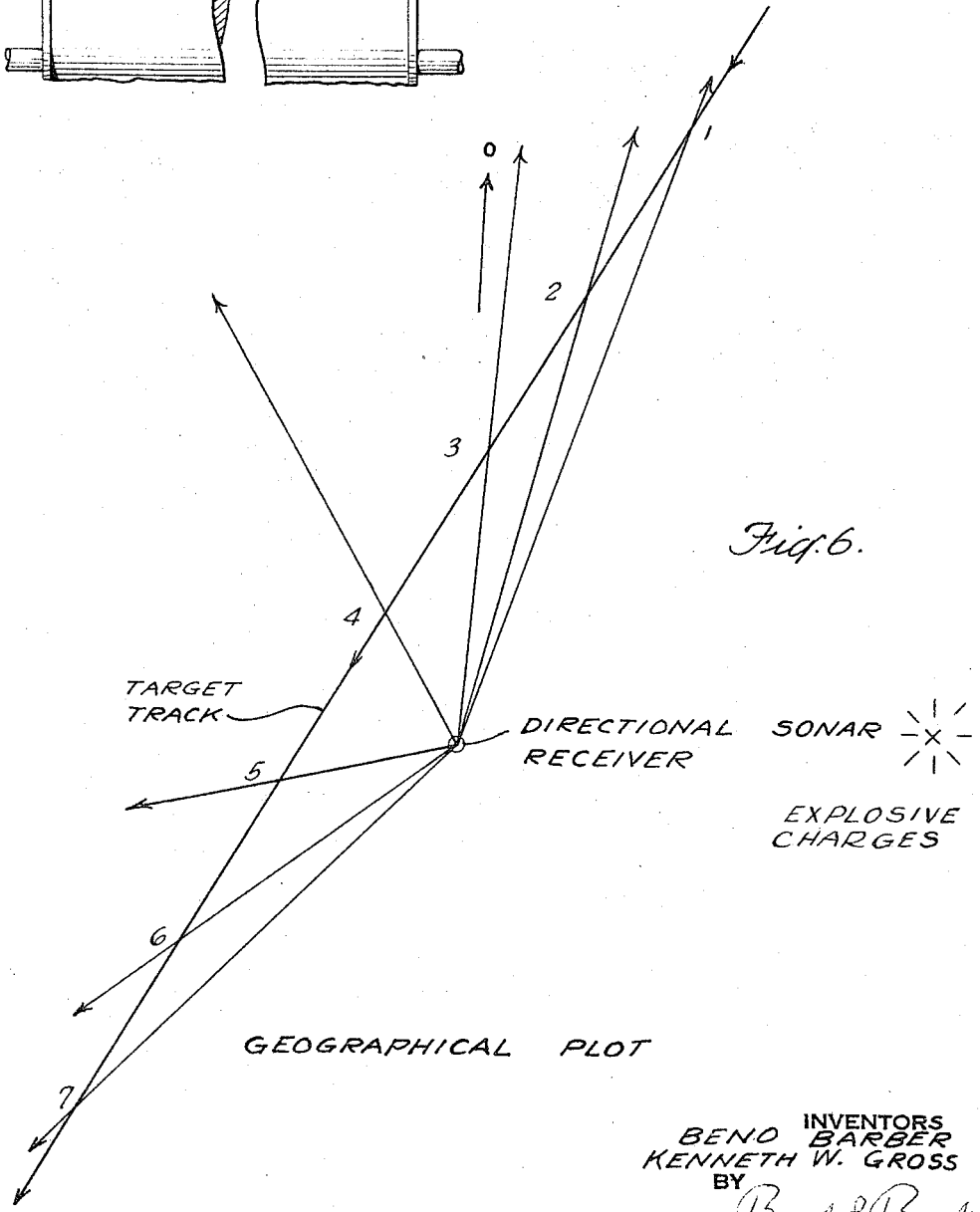
FIG. 6 is a target track plot.

Assume that the tactical and geographical situation shown in FIGURE 6 exists. A directional listening passive sonar receiver is placed in the ocean. The characteristic of this receiver is that it is omnidirectionally alert to all signals and gives as an output (after processing), X and Y voltages related to the signal direction with respect to a reference bearing of the sonar device.

The target approaches the location of the receiver from the upper right, passing to the lower left. For purposes of simplification the receiver is assumed to be stationary. Bearing lines are shown for equal distances along the target track and these, for a constant target speed, are equal time intervals. The location of an explosive charge is also shown but is to be disregarded for the time being.

Figure 7:
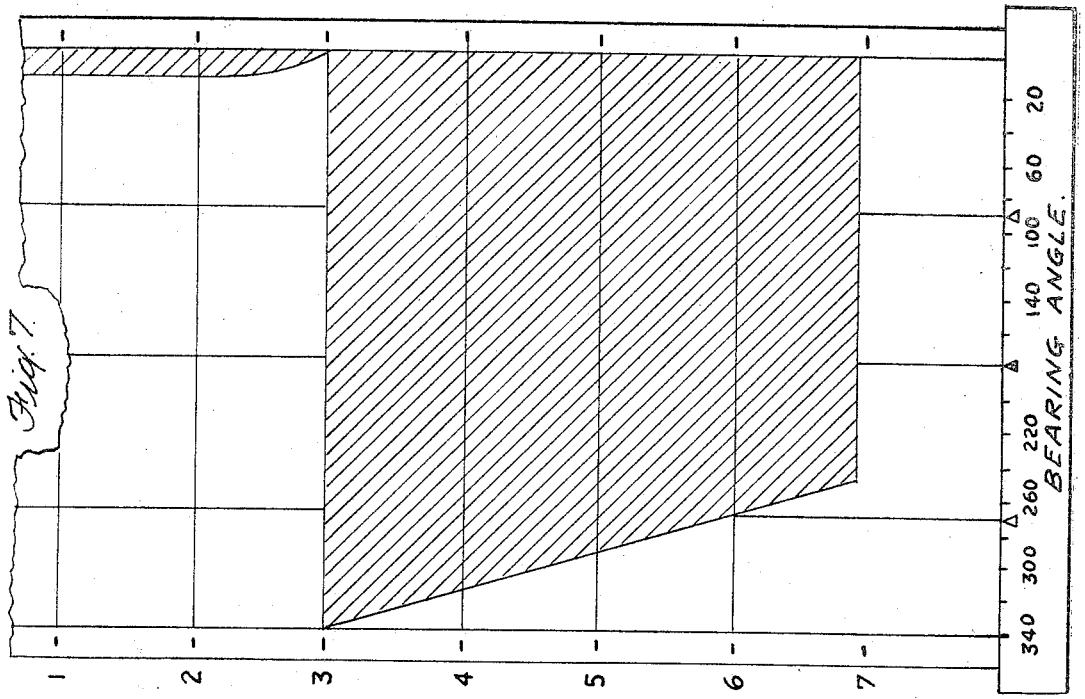
FIG. 7 is a bearing time recorder plot effected without explosive charges.

The resulting target plot that would be seen is shown in FIGURE 7. Numbers along the left-hand side correspond to the numbered bearing lines of FIGURE 6. The noisy target approaches into the listening range where the signal is perceptable above the random ocean noise at about the location of bearing 1. The angle, with respect to reference, is approximately 20° and is so recorded at that time. As the target passes by the receiver, the bearing changes as the target passes close by the receiver, bearings 3, 4 and 5, the bearing angle shifts rapidly finally passing out of range of the receiver at around bearing 7 where the mark passes below the perceptable level of the local ambient noise. At this time the bearing has become essentially constant at approximately 225°.

Figure 8:
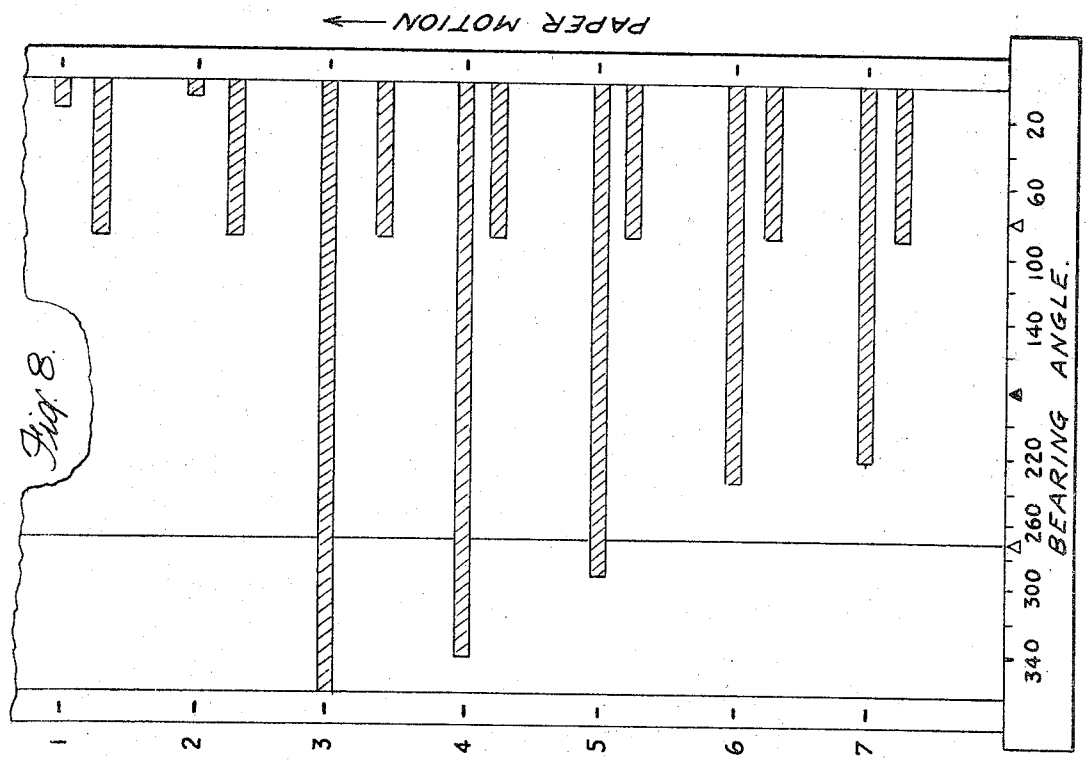
FIG. 8 is a bearing time recorder plot effected with the use of explosive charges.

For the next example, shown in FIGURE 8 it is assumed that the target is running silently and that the signal level never rises appreciably above the local ambient noise. The recorder, therefore, will not reproduce the track of the target as shown in FIGURE 7. Assuming that it is known that the target is in the vicinity, the tactical operation would be to place a charge bouy somewhere in the water close by the receiver. This is shown in FIGURE 8 as previously mentioned. A "charge buoy" contains several explosive charges that are released and exploded either periodically or on command. We will assume that they are fired off periodically, for simplicity.

The first charge is exploded and the sound of the explosion is received from a relative bearing of 90°. At a later time, equal to the difference in the length of the sound paths, the target echo is received and recorded along a bearing of approximately 20°. The explosive signals and the subsequent target echo signals are recorded periodically as the charges are exploded.

It is not practical to keep the sonar device fixed with repect to the North Pole. Therefore, a compass is inserted in the sonar device which measures the angle between sonar device and the North Pole. The difference between the compass angle and the bearing angle from sonar device in the true bearing of target with respect to the North Pole. It is this difference angle which is of tactical interest.

Various modifications of this invention may be effected by persons skilled in the art without departing from the scope and principle of the invention as defined by the claims.

What is claimed is:

1. Means for recording direction angle signals of a transient nature comprising a carrier oscillator, a display device synchronized with said oscillator, a phase shifter connected to said oscillator, a modulator connected to the output of said phase shifter, a second modulator connected to said oscillator, a summing amplifier connected to the output of both modulators, means connected to said amplifier for detecting a pre-selected relative output value thereof and generating a pulse each time said value is detected, said display device being actuated by said generated pulse, said detecting and generating means comprising a 90° phase shifter and a zero crossing detector connected to the output of said 90° phase shifter, an "AND" gate connected to the output of said zero crossing detector and a signal threshold trigger is connected between said summing amplifier and said "AND" gate.

2. Means for recording direction angle signals of a transient nature comprising a carrier oscillator, a display device synchronized with said oscillator, a phase shifter connected to said oscillator, a modulator connected to the output of said phase shifter, a second modulator connected to said oscillator, a summing amplifier connected to the output of both modulators, means connected to said amplifier for detecting a preselected relative output value thereof and generating a pulse each time said value is detected, said display device being actuated by said generated pulse, said display device being a dual beam linear sweep oscilloscope, an event signal line being connected to said oscilloscope, a "time" sweep line being also connected thereto and having a threshold detector and linear time sweep generator disposed therein and connected to receive the output of said means for detecting a pre-selected output value.

References Cited by the Examiner

UNITED STATES PATENTS

| 2,754,493 | 7/1956 | Lippel | 340—16 |
| 3,027,219 | 3/1962 | Bradley | 346—110 |
| 3,091,762 | 5/1963 | Schwertz | 343—11 |
| 3,148,351 | 9/1964 | Bartlett | 340—16 |
| 3,180,977 | 4/1965 | Brakel | 235—189 |
| 3,187,169 | 6/1965 | Trammell et al. | 235—189 |

OTHER REFERENCES

Waynick et al.: "A Polar Vector Indicator," National Electronics Conference Proc., vol. 4, published Feb. 28, 1949, pp. 279 and 282 relied on.

RODNEY, D. BENNETT, *Primary Examiner.*

LEWIS H. MYERS, CHESTER L. JUSTUS, *Examiners.*

R. A. FARLEY, *Assistant Examiner.*